R. D. PIKE.
APPARATUS FOR MOLDING ARTICLES FROM PLASTIC MATERIALS.
APPLICATION FILED MAR. 8, 1920.

1,394,786.

Patented Oct. 25, 1921.
5 SHEETS—SHEET 1.

INVENTOR.
Robert D Pike.
BY Acker & Totten
ATTORNEYS.

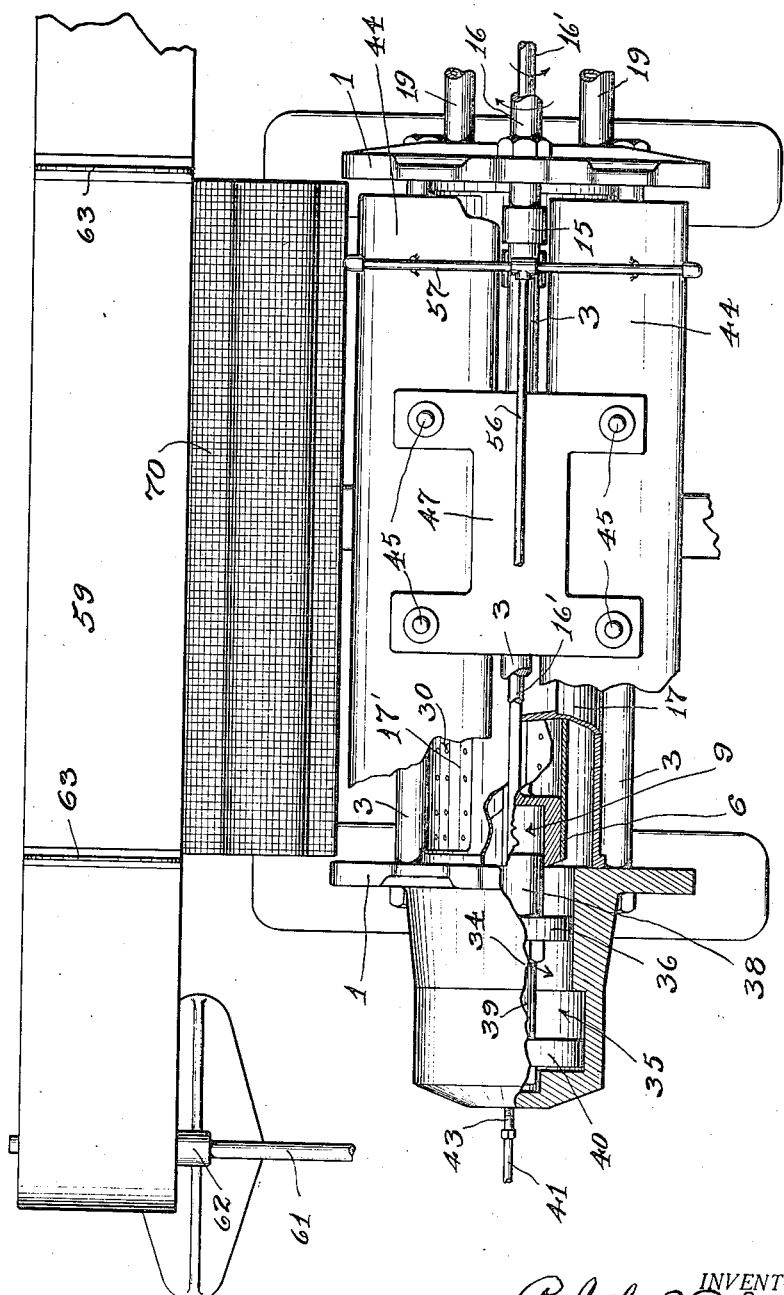

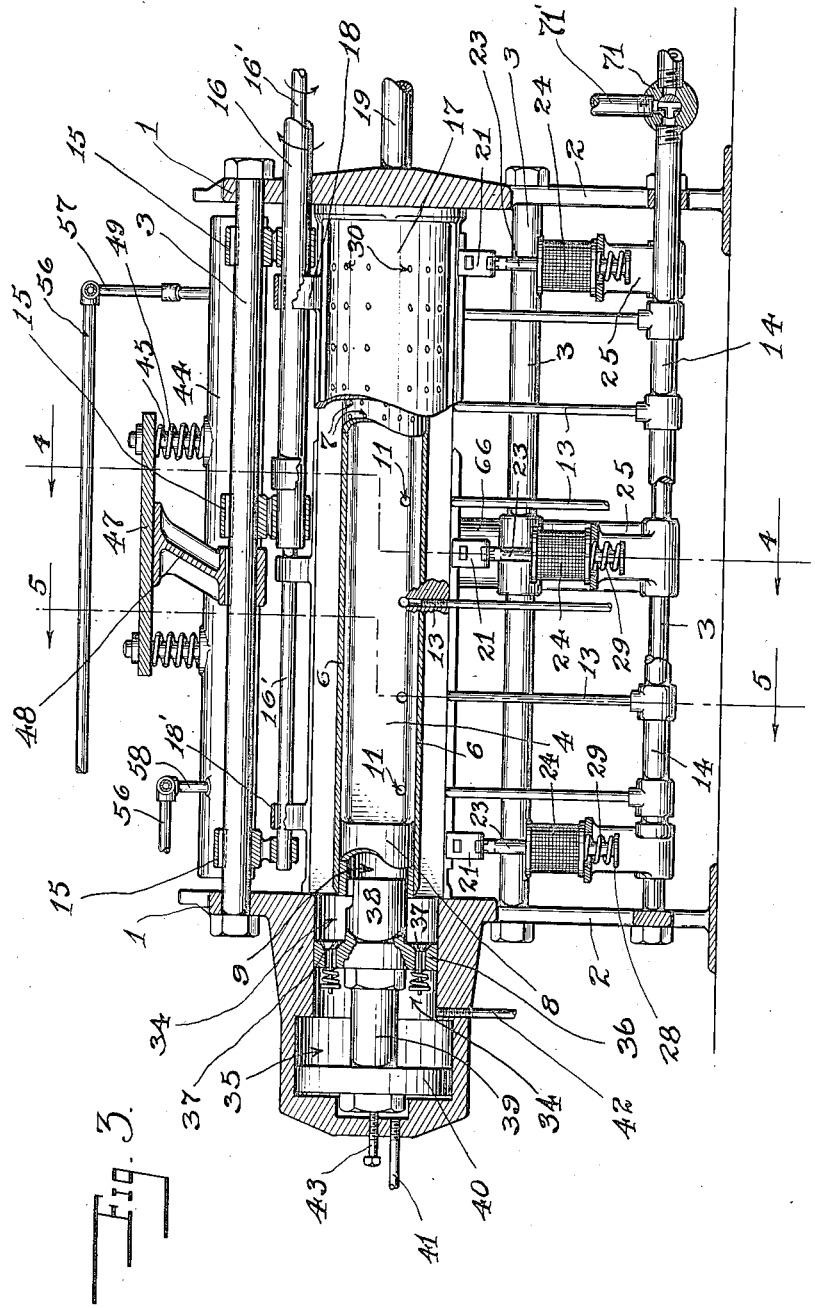

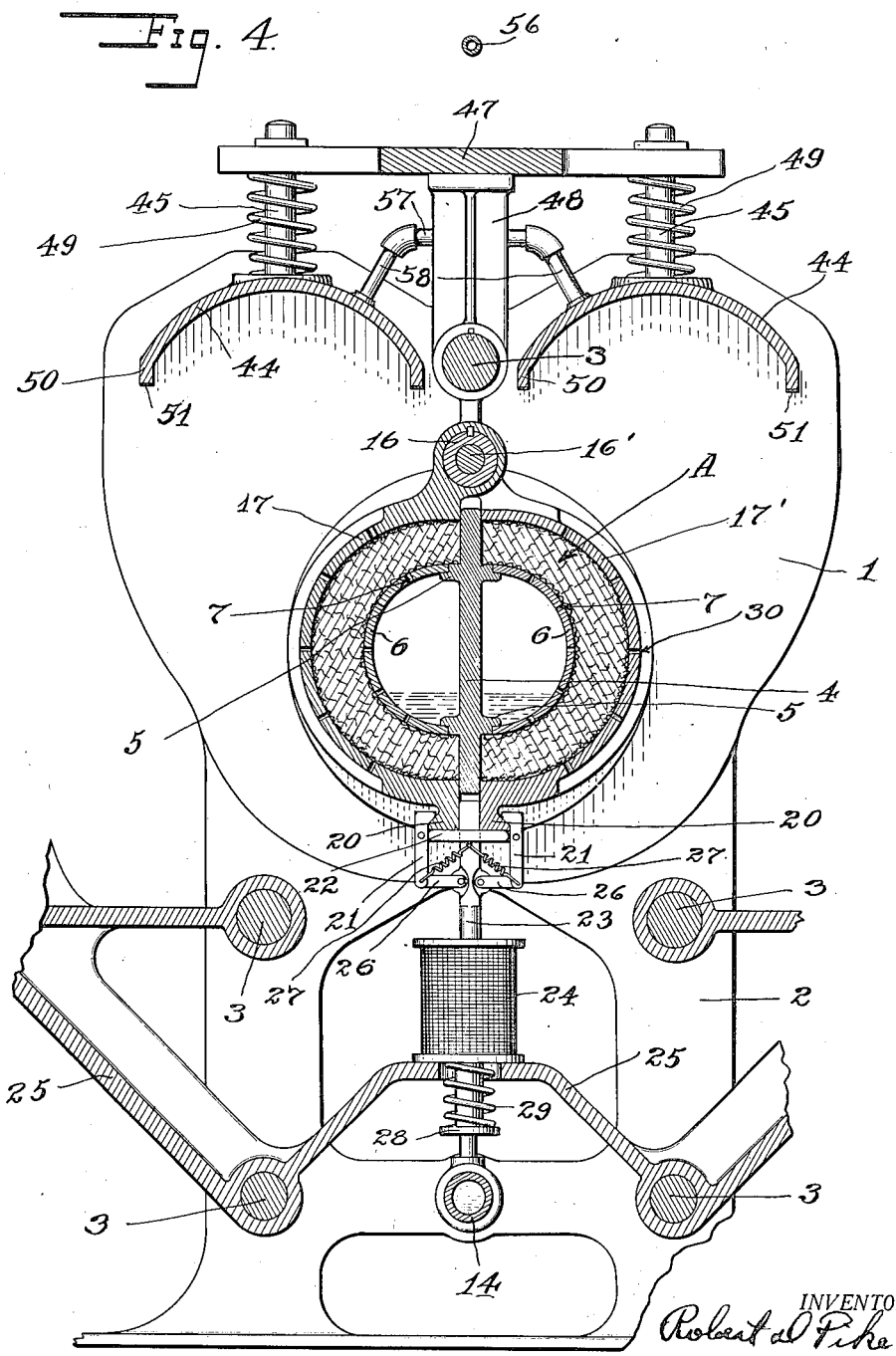

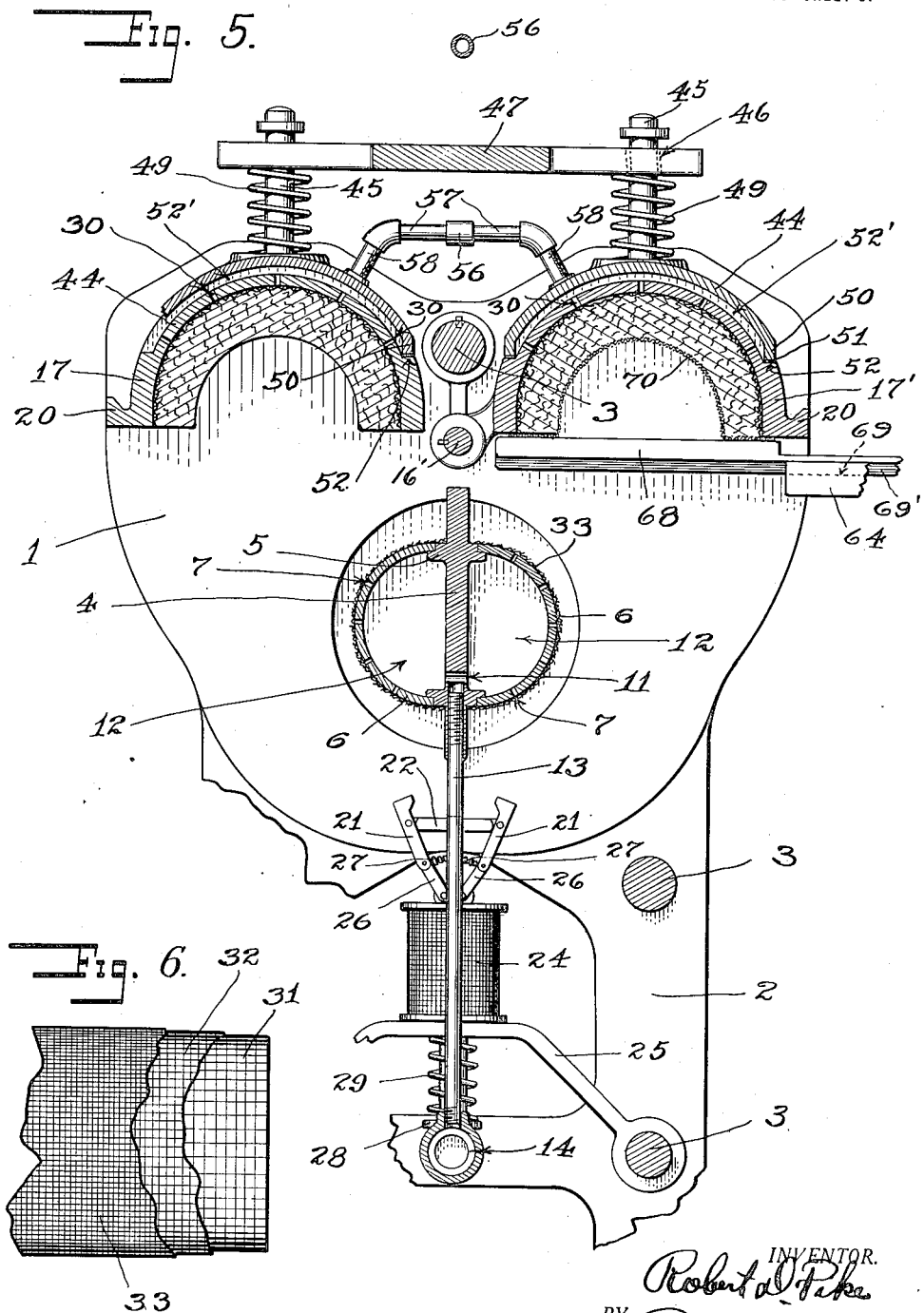

UNITED STATES PATENT OFFICE.

ROBERT D. PIKE, OF SAN FRANCISCO, CALIFORNIA.

APPARATUS FOR MOLDING ARTICLES FROM PLASTIC MATERIALS.

1,394,786.   Specification of Letters Patent.   Patented Oct. 25, 1921.

Application filed March 8, 1920. Serial No. 364,125.

*To all whom it may concern:*

Be it known that I, ROBERT D. PIKE, a citizen of the United States, residing at the city and county of San Francisco and State of California, have invented certain new and useful Improvements in Apparatus for Molding Articles from Plastic Materials, of which the following is a specification.

The present invention relates to an improved apparatus for effecting the molding of articles from plastic or semi-plastic material, and more particularly for the molding of magnesia, asbestos insulating articles, particularly of the type adapted for inclosing cylindrical structures.

One of the principal objects of the present invention is to provide an apparatus which is automatic in its operation, and by the use of which high pressures of molding are capable of being employed in an apparatus of comparatively light weight and few parts for performing the automatic operation. Another object is to provide a construction of the double form and core type, whereby two semi-cylindrical sections are capable of being formed simultaneously; one wherein the mold actions are pivotally connected and are power operated to move one relatively to the other to open and close the mold. A further object is to provide a construction wherein the formed articles are automatically removed from the molding apparatus, and one wherein an apparatus is provided capable of being operated by few attendants, thereby materially reducing the cost of construction of the articles over that entailed by the use of the apparatus employed at the present time.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Fig. 2 is a view in top plan with a portion of the apparatus broken away, disclosing the interior construction thereof.

Fig. 3 is a longitudinal sectional view of the apparatus, disclosing more particularly the perforated core and mold parts, the means for compressing the material within the mold space, and the means for latching the mold parts in closed position.

Fig. 4 is a vertical sectional view taken on line 4—4 of Fig. 3 with the mold parts in closed position.

Fig. 5 is a sectional view taken on line 5—5 of Fig. 3 with the mold parts in opened position.

Fig. 6 is a view in detail of the lining for the core and mold parts.

Figure 1:
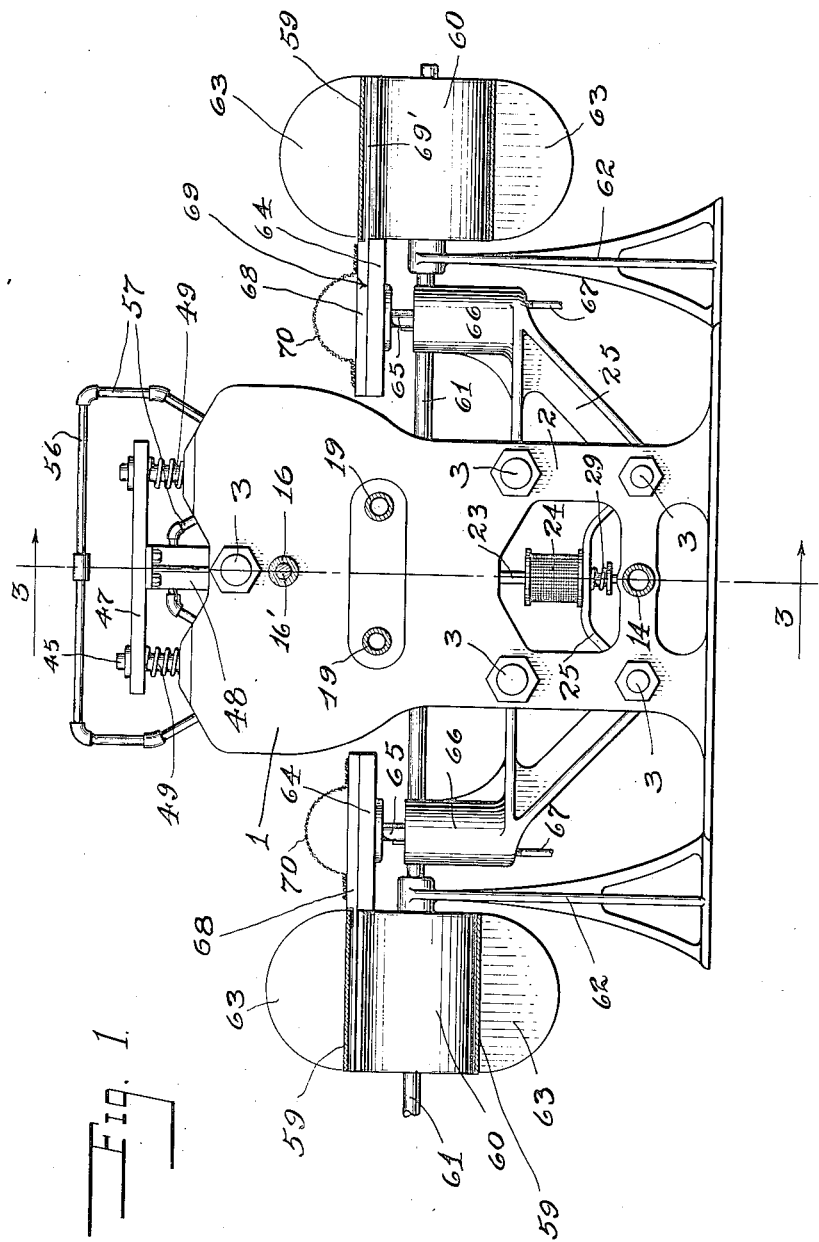
Figure 1 is a view in end elevation of the preferred embodiment of my invention.

In the drawings wherein like characters of reference designate corresponding parts, the numeral 1 indicates the spaced end plates of the apparatus supported by legs 2, the adjacent faces of the end plates 1 are flat and are disposed in parallel spaced relation and are held as in the drawings by the end plate tie rods 3, certain of which connect through the legs 2 and another connects the end plates through their vertical center line adjacent the upper edge thereof, as indicated in Figs. 1, 3, 4 and 5 of the drawings.

A core member is disposed between said end plates and the same is preferably constructed in the following manner: Connecting the inner faces of the end plates 1, is a suitable horizontally disposed stationary support 4, formed on its opposite sides with the longitudinally extending outwardly projecting recessed flanges 5, which mount in any suitable manner the transversely curved core plates 6, semi-circular in cross-section and provided throughout their length with perforations 7. One end of the stationary support 4 is enlarged to substantially cylindrical form as indicated at 8, the interior thereof providing a piston guide cylinder 9.

The support 4 is provided with a plurality of transverse passages 11 connecting the chambers 12, formed on opposite sides of the stationary support and from said transverse passages extend the drain pipes 13 connecting at their lower end with a common header 14, Fig. 3 of the drawing.

Associated with each core-plate 6 is a mold plate, movable to and from the core-plate and between the inner surface of which and the core-plate the magma is supplied and is formed into the articles desired; in the present case, they being cylindrical sections designed to incase or protect a pipe, and said molds are constructed and are operated in the following manner:—

From the tie-rod 3, which is disposed above and parallel with the upper edge of the stationary support 4, depend the bearing brackets 15, which mount the concentric shafts 16 and 16', disposed immediately above the upper edge of the stationary support 4. The shafts 16 and 16' extend through the forward end plate 1 as indicated in Fig. 3 and are connected to and operated to open position as indicated by the respective arrows associated therewith, by any suitable mechanism not shown. Coöperating with the respective core-plates 6 are the mold plates 17 and 17', semi-circular in cross-section and of a length corresponding to the distance between the inner faces of the end plates 1 enabling said mold plates to be moved between the faces of the end plates 1 and having a snug or sliding fit therewith. The mold plate 17 is keyed through the sleeves 18 with the shaft 16 and the mold plate 17' is keyed to the shaft 16' through the sleeves 18', thus on the axial rotation of the shafts 16 and 16' in opposite directions the mold plates 17 and 17' are caused to swing to and from the core-plates 6. The curvature of the mold plates 17 and 17' is on a greater radius than that of the core plates 6, providing a space between the coöperating core plates 6 and the mold plates 17 and 17', in which space the pipe coverings are formed. To supply the magma to the spaces A, between the coöperating core plates 17 and 17', I provide suitable valve controlled magma feed pipes 19 connected to a suitable supply of magma and extending through the forward end wall 1 of the apparatus, the material being forced through said pipes 19 into the respective chambers A under pressure by any suitable mechanism. To maintain the mold sections 17 and 17' in closed position about the core plates 6, as indicated in Fig. 4 of the drawings, any suitable mechanism may be employed, but I prefer to use the following: When the mold plates are in closed position the upper and lower longitudinal edges thereof are in tight contact with the upper and lower longitudinal side edges of the stationary support 4. The lower edges of each of said mold plates 17 and 17' is provided with a lip 20, respectively with which are adapted to coöperate the latch members 21, pivotally connected together by a member 22 mounted on the upper end of an extension 23 projecting from an armature, not shown, which passes through a solenoid 24 supported by a cross frame member 25, carried by certain of the tie rods 3 beneath the stationary support 4, and preferably immediately above the drain header 14. The lower end of the latch members 21 are connected through links 26, with said extension 23, and from their fulcrum points extend suitable coiled springs 27, which connect with the extension 23 intermediate the links 26 and member 22. Extending from the lower end of the armature is a flanged member 28 between the flange of which and the under surface of the solenoid is mounted a coiled spring 29, which draws the armature downwardly in the solenoid on the interruption of the supply of electricity to said solenoid, and to cause said latch members to assume the position as in Fig. 5 of the drawings. The latched members and solenoids with their associated parts are illustrated in Fig. 3 as preferably three in number, and arranged at spaced intervals throughout the length of the mold plates 17 and 17'. Current is supplied to the solenoids 24 from any suitable source and when said solenoids are energized the armatures therein are raised against the tension of the springs 29 to cause the latch members 21 to assume a position as in Fig. 4 of the drawings, and in engagement with the lips 20, retaining the mold plates 17 and 17' in what may be termed closed position about the core plates 6. The mold plates 17 and 17' are provided with suitable drain openings 30 and said mold plates on their inner surfaces are provided with suitable filtering means, preferably of laminated form, and in the present instance consisting of an inner layer 31 of wire cloth of approximately a quarter inch mesh, an intermediate layer 32 of wire cloth of approximately #10 mesh and an exterior layer 33 of heavy canvas which is disposed adjacent the inner face of said mold plates 17 and 17'. The exterior surface of the core plates 6, are provided with a corresponding laminated filtering structure consisting of the layers 31, 32 and 33 and which filtering structures associated with the core and mold plates admit of the fluid contained in the magma of passing through the respective openings 7 and 30, and retain the heavier particles of magma in the spaces A during the pumping of the magma under pressure into said spaces.

As before stated, the magma is supplied, under pressure, to the chambers A through the pipes 19, and the chambers becoming filled to their capacity the excess water of the magma, which is forced from the material by the filling pressure passes through the filtering material and through the respective openings 7 and 30 in the core plates 6 and mold 17 and 17'. To expel the remaining moisture or water from the semi-solid substances within the chambers and to obtain a closure cohesion of the solids, I provide in the rear end plate 1 communicating at one end with the rear ends of the chambers A, a cylindrical bore 34, enlarged at its rear end as at 35. Within the bore 34 is mounted a ported piston 36, the ports of which are controlled by spring-seated valves 37, and disposed concentrically of the forward face of said piston 36 is a smaller guiding piston 38 formed with relief chambers and operating in the cylinder 9. From the rear of the piston 36, extends the piston rod 39 mounting an actuating head 40, operatable within the enlarged bore 35. Communicating with the opposite ends of the enlarged chamber 35 are suitable air pressure pipes 41 and 42, air admitted through the pipe 41 being adapted to force the actuating head and its coöperating parts toward the rear end of the chamber A, and air admitted through the pipe 42 forcing the parts in a reverse direction. On the forward movement of the pistons 36 and 38 and head 40, the magma which has been pumped or supplied under pressure into the bore 34, in advance of the piston 36, is forced into the rear end of the chambers A, tightly compressing the solid portions or particles of the magma within said chambers A, and during such compressing, expressing the moisture therefrom which passes from the chambers A through the filtering material and the openings 7 and 30. Simultaneously with this operation, the piston 38 is forced forwardly in the cylinder 9, guiding the piston 39 in its movement. After these pistons in their operating head have completed their forward stroke the air supply through the pipe 41 is cut off and air is admitted through the pipe 42, moving the pistons 36 and 38 and their head 40 rearwardly in their respective chambers, and during this operation the valves 37 are actuated to prevent the formation of a vacuum in advance of the piston 36. The expelled water draining from the chambers 12, through the pipes 13 and outwardly through the header 14. The rear stroke of the head 30 and its associated pistons to regulate the amount of material received in the bore 34 in advance of the face of the piston 36, is controlled by the adjusting screw 43, Figs. 2 and 3 of the drawings.

After the semi-cylindrical sections of compressed magma are formed as above described in the spaces A between the coöperating mold plates 17 and 17', and their associated core plates 6, the same are in a condition to be removed therefrom and the mold to be opened, and in carrying out this operation, the device is operated in the following manner:

The solenoids 24, are deënergized by the cutting of the electric current thereto, permitting the springs 29 to move the latches 21 from the position illustrated in Fig. 4, to that illustrated in Fig. 5, releasing or unlocking the free edges of the mold plates 17 and 17'. The concentric shafts 16 and 16' are then rotated in the direction of the arrows Fig. 3 of the drawings, to swing the mold plates 17 and 17' from the vertical position illustrated in Fig. 4 to a horizontal position as illustrated in Fig. 5, and due to the increased area of the mold section in the chambers A contacting with the exterior surfaces of the core plates, the molded forms tend to move with the outwardly swung mold plates 17 and 17' as in Fig. 5 of the drawings, and to insure the detachment of the molded forms from the core plates the valve 71 is thrown to the position as in Fig. 3 of the drawings and compressed air is admitted through the pipe 71'.

To retain the molded form in contact with the inner surface of the respective mold plates when the same are in their horizontal position, I prefer to employ the following mechanism:

Disposed in parallel relation to overlie the respective mold plates 17 and 17' when the same assume their horizontal position, as in Fig. 5 of the drawings, I provide the transversely curved elongated hoods 44, upwardly from which at spaced points extend the guides 45, passing through and operating in guide openings 46 in a suitable supporting plate 47, carried by a bracket 48, extending upwardly from the uppermost tie rod 3. Springs 49 coiled about the members 45 and positioned between the under surface of the plate 47 and the upper surface of the hoods 44 force said hoods downwardly below the under side of the plate 47 and provide a yieldable mounting for the hoods to compensate for various angles of rest of the mold plates when the same are brought to substantially horizontal position. The hoods at their longitudinal side edges and at their ends are provided with lips 50, which carry suitable packing material 51 which connects with the longitudinal flanges 52 formed on the outer surface of the respective mold plates as indicated in Figs. 4 and 5 of the drawings. This construction provides a chamber 52' on the under surface of the hoods 44. A vacuum is drawn and maintained with the chambers 52' when the mold plates are in their horizontal position, as in Fig. 5, through suitable connected main pipes 56, from which extend the laterals 57 connected through flexible members 58, with the respective chambers 52', Figs. 3, 4 and 5 of the drawings.

The mold sections are discharged from the mold plates 17 and 17' and are conveyed from the apparatus in the following manner:

Extending parallel with the opposite sides of the apparatus and positioned in parallel spaced relation with the free edges of the mold when the same are in their horizontal position are the endless conveyer belts 59, extending to any suitable point and at one end over pulleys 60, mounted on the opposite ends of a shaft 61 extending transversely of the rear end of the apparatus and supported in bearings at the upper ends of the frames 62. The conveyer belts are provided at spaced intervals with the upstanding conveyer plates 63, positioned a distance from each other slightly greater than the length of the formed sections. Disposed to lie with one edge in line with the inner edge of each belt 59 and with its other edge underlying the free end of the mold plate when the same are in their horizontal position, are suitable supports 64 carried by a vertically movable plunger 65, each of which operates in a cylinder 66, mounted at opposite ends of the central cross frame member 25. The plungers are elevated and lowered by air admitted into the base thereof through suitable pipes 67 and the limit of their elevation is slightly below the formed material held within the mold plates when the same are in their horizontal positionings in Fig. 5 of the drawings. Carried by the upper surface of the respective supports 64 are the receiving tables 68 movable transversely of the tables 64 in guides 69, said tables when in their lowermost position being disposed with their upper surface flush with the upper flight of the belts 59, and provided with laterally extended portions 69', providing an operating means for the tables and which lie beneath the under surface of the upper flight of the belts 59, when the upper surface of the tables are disposed flush with the upper surface of the upper flights of the belts 59. On the lifting of the support 64 to a position as in Fig. 5 of the drawings, the tables with supporting forms 70 mounted thereon, and of a configuration corresponding to the interior configuration of the molded article, are positioned immediately below the molded form. Air under pressure is then admitted into the chamber 52' of the hood 44 to release the molded form from the interior of the mold plates 17 after which time the receiving table 68 and support 64 are lowered and the tables are moved relative to the supports to the position illustrated in Fig. 1, at which time an operator moves the supporting forms 70 from their respective tables and positions the same on the belts 59 between the partition 63. Should the lining of filtering material on the interior of the mold plates become separated from the inner surface of the mold plates during the discharging of the molded forms therefrom, it is only necessary to draw a vacuum in the pipes 57 which will cause the filtering material to assume its normal position.

By reference to Fig. 3 it will be observed that I provide the controlling valve 71 in the drain header 14, which valve is moved to open position during such time as the magma is supplied under pressure to the molding chambers to permit the fluid forced through the drain openings 7 by the filling pressure to drain from the chambers 12, through the header 14. This valve remains open during the forward movement of the pistons 36 and guide piston 38, at which time the magma is compressed and the fluid is expressed therefrom under pressure. It will be observed that during the reverse movement of the piston 36 the valves 37 in the piston 36 unseat to prevent a formation of a vacuum at the ends of the molded chambers.

It will be apparent that by arranging the controlling means, such as switches and levers of this present apparatus, at a convenient place the entire apparatus is capable of being controlled by a single operator, thereby materially reducing the cost of forming magnesia asbestos pipe coverings, and whereby the output thereof is capable of being increased over the output now possible in machines as at present employed.

It is to be understood that the present device may be constructed with the piston compressing member eliminated therefrom, and the sole pressure to be relied on for the compressing of the material to be molded may be that pressure under which the material is supplied into the mold chamber. It will be apparent that the construction of the device with the compressing chamber eliminated will provide an apparatus of the stationary core type and a movable mold plate associated therewith and by the employment of which type of apparatus the mold is capable of being more quickly opened and closed thereby enabling the formation of a greater number of articles within a given time than is possible in the sole operating presses or molds as present used.

Having thus described my invention what I claim is:

1. A molding apparatus comprising a horizontal support, a core associated therewith, a mold plate associated with the core and between which and the core is formed a molding chamber, a horizontal fulcrum for said molding plate, means for swinging the molding plate on its fulcrum to open and close the mold, means for retaining the mold plate in closed position, means for supplying flowing material under pressure to the molding chamber to fill the same to its capacity under said filling pressure, a second chamber communicating with the molding chamber and for receiving material overflowing from said molding chamber, and means within said latter chamber for forcing the material contained therein into the molding chamber, and for compressing the flowing material contained within the molding chamber to express the fluid therefrom and to compress the material within the molding chamber.

2. A molding apparatus comprising a support, a perforated core permanently associated therewith, a perforated molding plate mounted for pivotal movement at one edge of the core and between which and the core is formed a relatively closed molding chamber, means for moving said plate to open and close said mold to permit the detachment of the molded article from the core and the removal of the article from the molding chamber, means for supplying flowing material under pressure to the molding chamber to fill the same to its capacity, and means for compressing the flowing material within the molding chamber to express the fluid therefrom through the perforations in said mold members and to compress the material in said chamber.

3. A molding apparatus comprising a foraminous core member, a foraminous mold plate associated with and between which and the core is formed a relatively closed molding chamber, said mold plate being pivoted for swinging movement, a feed pipe connected with one end of said molding chamber and through which flowing material is supplied to said chamber under pressure to fill the same to its capacity under pressure, a second chamber connecting with the molding chamber and filled with material simultaneously therewith, and a plunger in said second chamber associated with said mold chamber for expressing the material from the second chamber, and compressing the material within the molding chamber under additional pressure to express the fluid therefrom through the foraminous wall surfaces and compress the material in the mold chamber.

4. A molding apparatus comprising a supporting member, a curved foraminous core carried thereby providing a chamber between the inner face of the core and said support, a curved foraminous core plate pivotally supported at one edge and adapted when in closed position to inclose said core and to contact with said supporting member providing a relatively closed molding chamber between said core and mold plate, means for retaining the members in closed position, a pump for supplying flowing molding material into said molding chamber under pressure to fill the same to its capacity, and means coöperating with said chamber between said core and support and within said molding chamber for compressing the flowing material within the molding chamber to express the fluid therefrom and compress the material in the mold chamber.

5. A molding apparatus comprising a supporting member, a curved perforated core carried thereby providing a chamber between the inner face of the core and said support, a curved perforated core plate pivotally supported at one edge and adapted when in closed position to inclose said core and to contact with said supporting member providing a molding chamber between said core and mold plate, means for retaining the members in closed position, means for supplying flowing material into said molding chamber under pressure to fill the same to its capacity, a piston coöperating with said molding chamber for compressing the flowing material within the molding chamber to express the moisture therefrom and compress the material in the mold chamber, and a valve in the piston associated with the mold chamber.

6. A molding apparatus comprising a supporting member, a curved perforated core carried thereby providing a chamber between the inner face of the core and said support, a curved perforated core plate pivotally supported at one edge and adapted when in closed position to inclose said core and to contact with said supporting member providing a molding chamber between said core and mold plate, means for retaining the members in closed position, means for supplying flowing material into said molding chamber under pressure to fill the same to its capacity, a piston coöperating with said molding chamber for compressing the flowing material within the molding chamber to express the moisture therefrom and compress the material in the mold chamber, and a valve controlled fluid outlet communicating with the chamber between said support and core.

7. A molding apparatus comprising a horizontally disposed core, a mold plate coöperating therewith and between which and said core is formed a mold chamber, a fulcrum for the upper edge of said mold plate whereby the same is capable of upwardly swinging movement on a horizontal fulcrum to open position, means for supplying flowing material to the mold chamber under pressure to fill the same to its capacity, means for expressing the fluid from the material and compressing the same in the mold chamber, a member capable of movement beneath the mold plate when in open position to receive the molded article discharged therefrom, and means for receiving the molded article from said member and for conveying the same from the apparatus.

8. A molding apparatus comprising a horizontally disposed core, a mold plate coöperating therewith and between which and said core is formed a mold chamber, a fulcrum for the upper edge of said mold plate whereby the same is capable of upwardly swinging movement on a horizontal fulcrum to open position, releasable means for engaging the free edge of the mold plate for retaining the mold forming member in closed position, means for supplying flowing material to the mold chamber under pressure to fill the same to its capacity, means for expressing the fluid from the material and compressing the same in the mold chamber, a member capable of movement beneath the mold plate when in open position to receive the molded article discharged therefrom, and means for receiving the molded article from said member and for conveying the same from the apparatus.

9. A molding apparatus comprising a horizontally disposed core, a mold plate cooperating therewith and between which and said core is formed a mold chamber, a fulcrum for the upper edge of said mold plate whereby the same is capable of upwardly swinging movement on a horizontal fulcrum to open position, releasable means for engaging the free edge of the mold plate for retaining the mold forming member in closed position, means for supplying flowing material to the mold chamber under pressure to fill the same to its capacity, means for expressing the fluid from the material and compressing the same in the mold chamber, a member capable of movement beneath the mold plate when in open position to receive the molded article discharged therefrom; means for discharging the molded article from the mold plate when the same is in its open position; and means for receiving the molded article from said member and for conveying the same from the apparatus.

10. A molding apparatus comprising a fixed perforated core member and mold plate between the faces of which is provided a relatively closed mold chamber, a piston cylinder communicating with the mold chamber, means for supplying flowing material to the mold chamber and piston cylinder under pressure to fill the same to their capacity, and a piston in said cylinder and capable of operation to force the material contained within the cylinder into the chamber and to express the moisture from said material to compress the material within said chamber.

11. A molding apparatus comprising a fixed perforated core member and mold plate between the faces of which is provided a mold chamber closed at one end, a piston cylinder communicating with the other end of the mold chamber, means for supplying flowing material to the mold chamber and piston cylinder under pressure to fill the same to their capacity, and a piston in said cylinder and capable of operation to force the material contained within the cylinder into the chamber and to express the moisture from said material to compress the material within said chamber.

12. A molding apparatus comprising perforated core and mold plate members between the faces of which is provided a molding chamber, a filter medium on the inner faces of said members, a piston cylinder communicating with one end of said mold chamber, a plate for closing the other end of the chamber, a pump for supplying flowing material under pressure to said molding chamber and cylinder to fill the same to their capacity, a piston in said cylinder and capable of operation to force the material in the cylinder endwise into the mold space and compress the same therein to express the liquid therefrom.

13. A molding apparatus comprising a horizontal support, a core associated therewith, a mold plate associated with the core and between which and the core is formed a molding chamber, a horizontal fulcrum for said molding plate, means for swinging the molding plate on its fulcrum to open the mold to permit the molded article to be removed from the core and from said mold chamber, means for retaining the mold plate in closed position, and a pump for supplying flowing material under pressure to the molding chamber.

14. A molding apparatus comprising a supporting member, a curved perforated core carried thereby providing a chamber between the inner face of the core and said support, a curved perforated core plate pivotally supported at one edge and adapted when in closed position to inclose said core and to contact with said supporting member providing a molding chamber between said core and mold plate, means for retaining the members in closed position, and means for supplying flowing material into said molding chamber under pressure to fill the same to its capacity.

15. A molding apparatus comprising a horizontally disposed core, a mold plate cooperating therewith and between which is formed a mold chamber, a fulcrum for the upper edge of said mold plate whereby the same is capable of upwardly swinging movement on a horizontal fulcrum to open position, means for supplying flowing material to the mold chamber under pressure to fill the same to its capacity, a member capable of movement beneath the mold plate when in open position to receive the molded article discharged therefrom, and means for receiving the molded article from said member and for conveying the same from the apparatus.

16. A molding apparatus comprising a horizontally disposed core, a mold plate cooperating therewith and between which and said core is formed a mold chamber, a fulcrum for the upper edge of said mold plate whereby the same is capable of upwardly swinging movement on a horizontal fulcrum to open position, releasable means for engaging the free edge of the mold plate for retaining the mold forming member in closed position, means for supplying flowing material to the mold chamber under pressure to fill the same to its capacity, a member capable of movement beneath the mold plate when in open position to receive the molded article discharged therefrom, and means for receiving the molded article from said member and for conveying the same from the apparatus.

17. A molding apparatus comprising stationary spaced end plates, a fixed core extended between said end plates, a mold plate coöperating with the core and mounted at one edge to swing to and from said core and relatively to the end plates, said mold plate when in closed position providing a molding chamber between the end plates and the inner face of said mold plate and said core, means for swinging said mold plate to permit the molded article to be detached from the core and removed from the mold chamber, and a pump for supplying molding material in a flowing condition under pressure into the molding chamber when said mold plate is in its closed position.

18. A molding apparatus comprising stationary spaced end plates, a perforated core extended between said end plates, a perforated mold plate coöperating with the core and mounted at one edge to swing to and from said core and relatively to the end plates, said mold plate when in closed position providing a molding chamber between the end plates and the inner face of said mold plate and said core, means for swinging said plate, and means for supplying molding material under pressure into the molding chamber when said mold plate is in its closed position.

19. A molding apparatus comprising spaced stationary end plates, a perforated core between said plates, a perforated mold plate between said end plates and between which and said core and end plates is formed a molding chamber, a drain for said core, means for supplying material under pressure to said molding chamber, means associated with one edge of said mold plate for providing a fulcrum therefor whereby said mold plate is capable of swinging movement relatively to said end plates to open position, and means for receiving the molded article from said chamber.

In testimony whereof I have signed my name to this specification.

ROBERT D. PIKE.